United States Patent [19]

Choquette

[11] Patent Number: 4,984,513
[45] Date of Patent: Jan. 15, 1991

[54] APPARATUS FOR COOKING AND SHAPING MEAT PIECES

[75] Inventor: Paul Choquette, Longueuil, Canada

[73] Assignee: Corporation Salaison Melrose, Montreal, Canada

[21] Appl. No.: 261,039

[22] Filed: Oct. 21, 1988

[51] Int. Cl.⁵ .......................... A47J 27/20; B30B 7/00
[52] U.S. Cl. ........................................ 99/349; 99/353; 99/426; 99/472; 100/244; 100/910
[58] Field of Search ................ 99/349, 351, 353, 355, 99/426-428, 430, 431, 439, 426, 472; 100/910, 244; 425/85, DIG. 60, DIG. 102; 17/32; 141/7, 8, 12, 73, 283

[56] References Cited

U.S. PATENT DOCUMENTS

| | | | |
|---|---|---|---|
| 2,337,406 | 12/1943 | Opie | 100/910 |
| 3,040,654 | 6/1962 | Opie | 99/349 |
| 3,114,644 | 12/1963 | Peterson . | |
| 3,548,890 | 12/1970 | Langen | 99/349 |
| 3,584,428 | 6/1971 | Falk | 99/472 |
| 3,638,554 | 2/1972 | Ackroyd . | |
| 3,730,740 | 5/1973 | Schack et al. . | |
| 3,854,391 | 12/1974 | Ackroyd | 99/349 |
| 3,987,209 | 10/1976 | Gatineau et al. . | |
| 4,184,825 | 1/1980 | Wolf | 425/85 |
| 4,281,593 | 8/1981 | Gevaert | 99/426 |
| 4,449,906 | 5/1984 | Sienkiewicz et al. . | |
| 4,555,985 | 12/1985 | Pacquet | 99/353 |
| 4,807,524 | 2/1989 | Ikeuchi et al. | 99/353 |
| 4,817,515 | 4/1989 | Bjerre et al. | 425/85 |

FOREIGN PATENT DOCUMENTS 2093758  9/1982  United Kingdom ................ 425/85

Primary Examiner—Timothy F. Simone
Attorney, Agent, or Firm—James R. Longacre; Michael L. Keller

[57] ABSTRACT

A process and an apparatus for cooking and shaping precut meat pieces such as beef cuts, pork cuts or the like. The process comprises the steps of placing an uncooked meat piece adjacent the opening of a shaping mold, subjecting the meat piece to an air pressure differential to cause the meat piece to enter the mold, and heating the mold to cook the meat piece therein.

8 Claims, 3 Drawing Sheets

APPARATUS FOR COOKING AND SHAPING MEAT PIECES

FIELD OF THE INVENTION

The present invention relates to the general field of meat processing and more particularly to a novel method and an apparatus for cooking and shaping precut meat pieces.

BACKGROUND OF THE INVENTION

Large scale production of meat products such as bacon, for retail to the public, consists of cooking meat pieces which are then smoked and sliced into individual portions to be refrigerated or packaged for distribution.

In the meat products industry, up to now, it has been a normal practice to remove from the production line the slices that come from the edges of the meat piece because those slices are too irregular in shape to meet the established quality standards. Subsequently, the edge slices are either discarded or sold as a low grade product, resulting in either case in a substantial monetary loss.

A solution to this problem is to cook the meat piece into a mold to produce a meat piece of highly regular shape with the result that when sliced, all the slices will be almost identical, thus minimizing waste.

This idea is not new and it first has been publicly disclosed in the U.S. Pat. No. 3,638,554, granted to Scott Meat Products Ltd on Feb. 1, 1972. This patent relates to an apparatus for loading a meat piece into a shaping mold which also serves as a cooking vessel. More particularly, the apparatus comprises a loading section, coupled to the mold and using a plurality of fluid rams to elevate the meat piece at the level of the mold and then to push the meat piece in the mold.

Undeniably, this apparatus constitutes a substantial improvement over conventional techniques, however, its ability for industrial applications is questionable considering its complexity and high maintenance cost required for long term use.

OBJECT AND STATEMENT OF THE INVENTION

A primary object of the present invention is to provide an improved method and an apparatus for cooking and shaping precut meat pieces used for making bacon or other meat products.

Broadly stated, the method for cooking and shaping meat, according to the invention, comprises the steps of placing a meat piece at the inlet of a shaping mold which also serves as a cooking vessel, subjecting the meat piece to an air pressure differential to drive the meat piece in the mold, and cooking the meat piece.

When the cooking process has been completed, the shaped meat piece is removed from the mold preferably by establishing an opposite pressure differential to suck the cooked meat piece out of the mold. The meat piece is then ready for further processing such as slicing and packaging.

The invention also extends to an apparatus for carrying out the above method comprising a shaping mold constituting a cooking vessel adapted to be coupled to a device for creating an air pressure differential between the outside and the inside of the mold, to exert a force on the meat piece causing it to enter the mold, and means to apply heat for cooking the meat piece. Preferably, the apparatus also comprises a device to extract the cooked meat piece from the mold.

In a preferred embodiment, the air pressure differential is created by establishing a sub-atmospheric pressure at the appropriate location to drive the piece of meat in the desired direction. For loading the mold, the sub-atmospheric pressure zone will be created inside the mold. For removing the meat piece from the mold, a sub-atmospheric pressure zone is created at the inlet of the mold.

It may also be envisaged to create the air pressure differential by creating a positive pressure instead of a negative pressure.

During the cooking process, it has been found advantageous to exert a continuous pressure on the meat piece to prevent the formation of air pockets as well as to obtain a more uniform meat density. At this end, in a preferred embodiment, the shaping mold is carried, during the cooking process, by a supporting device contacting the meat piece in the mold, wherein the combined weight of the shaping mold and of the meat piece serves to compress the latter.

Therefore, the present invention comprises in a general aspect, a process for cooking and shaping a precut meat piece, including the steps of:

placing a precut uncooked meat piece adjacent an inlet of a shaping mold, the shaping mold constituting a cooking vessel;

establishing an air pressure differential between the inside and the outside of the mold to drive the meat piece in the shaping mold; and heating the meat piece to cook it.

The invention also comprises, in combination:

a shaping mold having an inlet and being adapted to receive therein a precut uncooked meat piece, the shaping mold constituting a cooking vessel;

means in operative relation with the shaping mold to establish an air pressure differential between the inside and the ouside of the shaping mold to drive an uncooked meat piece adjacent the inlet in the shaping mold; and means for applying heat to the meat piece for cooking the meat piece.

The process and the apparatus, according to the present invention, are well adapted for the production of bacon, however, the invention is not limited to this application because it may very well be envisaged to apply the same inventive concept to the production of other precut meat products that require cooking and shaping.

DESCRIPTION OF A PREFERRED EMBODIMENT

Figure 1:
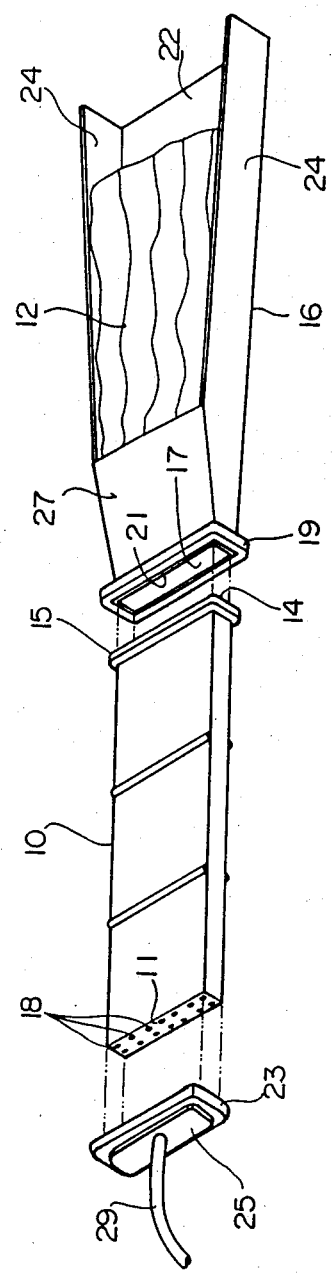
FIG. 1 is a perspective view of a meat mold, constructed in accordance with the present invention, in the process of being loaded with a meat piece to be cooked therein.

Referring now to the annexed drawings and more particularly to FIG. 1, the reference numeral 10 designates in general a shaping mold in the process of being loaded with a meat piece 12.

The mold 10 has a rectangular shape in cross-section comprising an open end 14 defining the inlet of the mold 10, the open end 14 being bordered by a connection flange 15.

At the extremity 11 of the mold 10, opposite the inlet 14, are provided perforations 18, providing an air passageway between the inside and the outside of the mold. As it will be explained hereinafter, the perforations 18 serve to establish a sub-atmospheric pressure in the mold 10 during the loading process thereof.

In front of the shaping mold 10 is mounted a loading trough 16 comprising a bottom wall 22, two upstanding side walls 24 and a top wall 27 substantially shorter than the walls 22 and 24.

The loading trough 16 further comprises an outlet opening 17, corresponding in shape and size to the inlet opening 14 of the mold 10, bordered by a connection flange 19 carrying a continuous sealing rubber gasket 21.

In order to effect a gradual compression of the meat piece 12 during the mold loading operation to reduce its dimensions to those of the mold 10, the side walls 24 are arranged to converge toward each other and the top wall 27 converges toward the bottom wall 22.

It has been found advantageous to fabricate the mold 10 and the loading trough 16 of stainless steel because it is corrosion resistant and easy to wash.

To establish a fluid communication between the perforations 18 and a vacuum source to evacuate the mold 10, a sealing block 23 is provided which is made of plastic material such as Teflon (trade-mark) comprising a deep recess (not shown in the drawings) facing the perforations 18 and defining a seat for receiving the extremity 11 of the mold 10. This recess, producing a bulge 25 at the rear of the block 23, closely conforms to the extremity 11 and it may comprise seals (not shown) to prevent air leaks between the sealing block 23 and the mold 10.

A flexible line 29 extends from the sealing block 23 to connect the recess therein to a vacuum source (not shown).

The loading of the mold 10 is carried out as follows. Firstly, the meat piece 12 is cut so that all its dimensions thereof, except the longitudinal dimension, exceed those of the mold 10 by an amount selected in accordance with the compressibility of the meat; the higher the compressibility, the larger the meat piece 12 may be cut. The mold 10 is brought against the loading trough 16 so that the flanges 15 and 19 are in abutting relationship, and the sealing block 23 is applied on the extremity 11 of the mold 10. The vacuum source is turned on to evacuate the mold 10, thus establishing an air pressure differential between the inside and the outside of the mold 10, causing the meat piece 12 to begin entering the mold. As the meat piece 12 advances, the air pressure differential increases because the meat piece, due to its flexibility, effectively seals the inlet 14 of the mold thus reducing vacuum losses resulting from air leaking between the flanges 15 and 19. The increased air pressure differential compensates for the increasing friction between the inner walls of the mold 10 and the meat piece 12.

When the meat piece 12 has fully entered the mold 10, it rests against the end wall of the mold opposite the inlet 14, there being a space 24 immediately adjacent the inlet 14 resulting from the fact that the meat piece 12 is slightly shorter than the mold 10.

Figure 3:
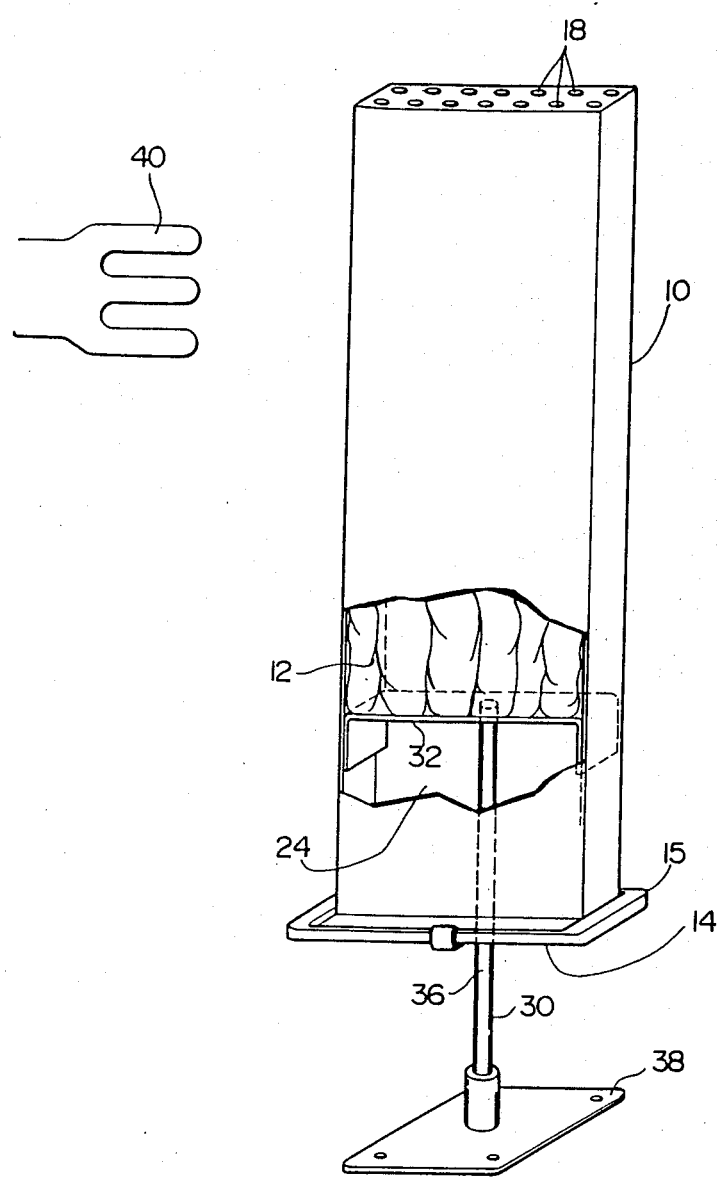
FIG. 3 is an enlarged perspective view of the shaping mold, partly in section, mounted on a supporting device during the cooking process of the meat piece.

The mold is then oriented vertically, as best shown in FIG. 3, and it is mounted on a supporting device 30 comprising a piston-like plate 32 on which rests the meat piece 12. The piston-like plate 32 is mounted at one end of a vertical rod 36 connected to a flange 38 secured to the floor.

Mounting the mold 10 on the supporting device 30 has the effect of exerting a longitudinal compression on the meat piece 12 which is function of the combined weight of the mold 10 and of the meat piece 12.

An electric heating element 40 is turned on to apply heat to the mold 10 for cooking the meat piece 12. Other means of heating may also be used without departing from the spirit of the invention.

The advantage of exerting a longitudinal compression on the meat piece 12 during the cooking process permits to obtain a more uniform meat density and prevents the formation of air pockets.

Figure 2:
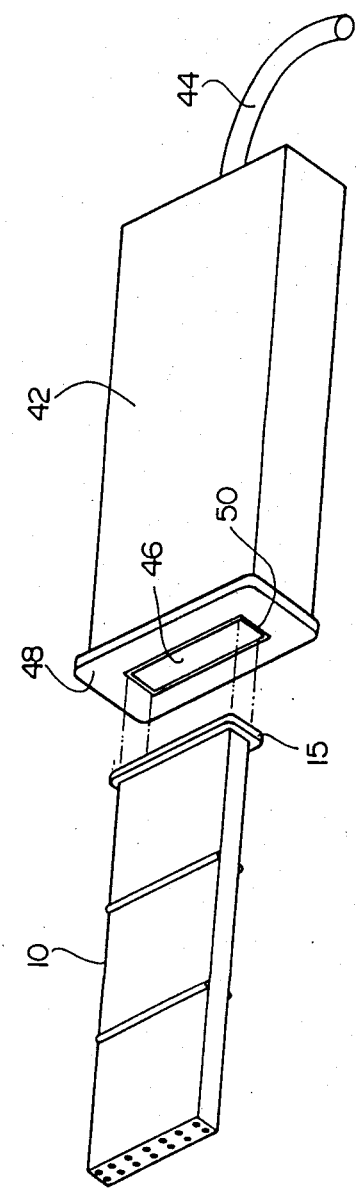
FIG. 2 is a perspective view of a set-up for extracting the cooked meat piece from the shaping mold.

When the cooking process is completed and the meat piece 12 has assumed permanently the shape of the mold 10, then it is necessary to extract the meat piece 12 from the mold. This may be achieved by the set-up illustrated in FIG. 2, comprising an extraction box 42, larger than the mold 10, coupled to a vacuum source (not shown) by a line 44. The extraction box 42 has an inlet 46, corresponding in shape and size to the inlet 14 of the mold 10, bordered by a flange 48 carrying a continuous rubber sealing gasket 50.

The extraction box 42 is also provided on the underside with a trap door (not shown) maintained in closed position by a suitable latch mechanism. The trap door is used for gaining access to the inside of the extraction box 42 for the removal of the meat piece 12 therefrom.

In use, the mold 10 is brought against the extraction box 42 so that the flanges 15 and 48 are in abutting relation. The vacuum source is turned on to establish a sub-atmospheric pressure in the box 42 for sucking the meat piece 12 out of the mold 10. When the meat piece 12 is received in the extraction box 42, the trap door is opened for removing the meat piece 12.

Although the invention has been described above with relation to a specific form, it should be clearly understood that this preferred embodiment may be varied and refined in various ways. Therefore, it is wished to have it understood that this description is given only as an example to facilitate the understanding of the invention and it should not be interpreted in any limiting manner. The scope of the invention is defined in the annexed claims.

I claim:

1. An apparatus for cooking and shaping a precut, uncooked piece of meat, comprising in combination:
    a shaping mold having a meat inlet and being structured to receive therein the precut uncooked piece of meat, said shaping mold constituting a cooking vessel;
    vacuum establishing means including opening means made in the shaping mold and generally facing the said meat inlet, for producing a sub-atmospheric pressure in the shaping mold to thereby drive in the said mold the uncooked piece of meat placed adjacent said meat inlet; and
    means for heating said shaping mold for thereby cooking said piece of meat.

2. An apparatus for cooking and shaping a precut, uncooked piece of meat, comprising in combination:
    a shaping mold having an inlet, an inside and an outside, and being structured to receive therein the precut uncooked piece of meat, said shaping mold constituting a cooking vessel;

means for producing an air pressure differential between the inside and the outside of said shaping mold for driving in the said mold the uncooked piece of meat placed adjacent said inlet, said air pressure differential producing means comprising a source of vacuum for producing a sub-atmospheric pressure within said shaping mold; and means for heating said shaping mold for thereby cooking said piece of meat.

3. An apparatus for cooking and shaping a precut, uncooked piece of meat, comprising in combination:

a shaping mold having an inlet, an inside and an outside, and being structured to receive therein the precut uncooked piece of meat, said shaping mold constituting a cooking vessel;

first means for producing an air pressure differential between the inside and the outside of said shaping mold for driving in said shaping mold the uncooked piece of meat placed adjacent said inlet;

means for heating said shaping mold for thereby cooking said piece of meat; and second means for producing an air pressure differential between the inside and the outside of said mold for driving said piece of meat out of said mold after cooking and shaping thereof.

4. The cooking and shaping apparatus of claim 2 wherein said shaping mold comprises opening means and means coupled to said opening means for establishing a fluid path between said opening means and the vacuum source.

5. The cooking and shaping apparatus of claim 4, wherein said shaping mold comprises an end opposite its inlet, and wherein said opening means are formed on said end of the shaping mold opposite its inlet.

6. The cooking and shaping apparatus of claim 5 wherein said fluid path establishing means comprise a sealing block in fluid communication with the vacuum source, said sealing block being formed with a recess for receiving the end of said shaping mold opposite its inlet.

7. The cooking and shaping apparatus of claim 3 wherein said second air pressure differential producing means comprise:

a meat extraction box that can be coupled to said inlet; and means for producing a sub-atmospheric pressure in said extraction box when coupled to said inlet for driving the piece of meat out of the mold after cooking and shaping thereof.

8. The cooking and shaping apparatus of claim 1 further comprising a meat loading through that can be coupled to the said meat inlet of the shaping mold.

* * * * *